United States Patent
Roberts et al.

(10) Patent No.: US 10,946,421 B2
(45) Date of Patent: Mar. 16, 2021

(54) PROCESS FOR PRODUCING A BIOCOMPATIBLE SOIL MIXTURE FROM CREMATED ASH REMAINS AND GROUND PENETRATING APPARATUS THEREFOR

(71) Applicant: LIVING LEGACY PTY LTD, Melbourne (AU)

(72) Inventors: Warren Roberts, Melbourne (AU); Mary Cole, Vervale (AU)

(73) Assignee: LIVING LEGACY PTY LTD, Melbourne (AU)

( * ) Notice: Subject to any disclaimer, the term of this patent is extended or adjusted under 35 U.S.C. 154(b) by 387 days.

(21) Appl. No.: 15/778,187

(22) PCT Filed: Nov. 24, 2016

(86) PCT No.: PCT/AU2016/051153
§ 371 (c)(1),
(2) Date: May 22, 2018

(87) PCT Pub. No.: WO2017/088024
PCT Pub. Date: Jun. 1, 2017

(65) Prior Publication Data
US 2018/0318893 A1    Nov. 8, 2018

(30) Foreign Application Priority Data

Nov. 24, 2015 (AU) ................................ 2015904858
Nov. 24, 2015 (AU) ................................ 2015904861

(51) Int. Cl.
*E04H 13/00*    (2006.01)
*C05F 1/00*    (2006.01)
(Continued)

(52) U.S. Cl.
CPC .............. *B09B 3/00* (2013.01); *A01C 21/007* (2013.01); *A01G 29/00* (2013.01); *B09C 1/10* (2013.01);
(Continued)

(58) Field of Classification Search
USPC .................... 47/58.1 SC, DIG. 10, 58.1 R
See application file for complete search history.

(56) References Cited

U.S. PATENT DOCUMENTS 4,666,497 A * 5/1987 Tenzer .................. C05F 11/08
                                                      435/252.1
5,701,642 A   12/1997 Order
(Continued)

FOREIGN PATENT DOCUMENTS

| CN | 104030758 A |   | 9/2014 |          |
|----|-------------|---|--------|----------|
| JP | 2008043823 A |  | 2/2008 |          |
| JP | 2008178830 A |  | 8/2008 |          |
| KR | 101467668   | * | 12/2014 | ............. E04H 13/00 |
| WO | 2008070215 A1 | | 6/2008 |          |

OTHER PUBLICATIONS

International Search Report & Written Opinion dated Mar. 27, 2017 from PCT Application No. PCT/AU2016/051153.

*Primary Examiner* — Andrea M Valenti
(74) *Attorney, Agent, or Firm* — Innovation Capital Law Group, LLP; Vic Lin

(57) ABSTRACT

There is provided A process for producing a biocompatible soil mixture from cremated ash remains, the process comprising: mixing cremated ash remains with a soil base material and a nutrient composition to produce a pre-conditioned mixture, the nutrient composition comprising at least one of paramagnetic material, soil conditioner and fertilizer; and conditioning the pre-conditioned mixture using a microbial conditioner to adjust the adverse chemical properties of the cremated ash remains biologically to produce a conditioned soil mixture being biocompatible for a (Continued)

legacy tree, wherein the pre-conditioned mixture comprises less than 10% of the cremated ash remains by volume.

21 Claims, 6 Drawing Sheets

(51) Int. Cl.
*A01C 21/00* (2006.01)
*A01G 29/00* (2006.01)
*C05F 11/00* (2006.01)
*B09B 3/00* (2006.01)
*B09C 1/10* (2006.01)
*C05D 9/00* (2006.01)

(52) U.S. Cl.
CPC ............... *C05D 9/00* (2013.01); *C05F 1/00* (2013.01); *C05F 11/00* (2013.01); *E04H 13/008* (2013.01); *B09B 2220/06* (2013.01); *Y02A 40/20* (2018.01); *Y02P 20/145* (2015.11); *Y02W 30/40* (2015.05)

(56) References Cited

U.S. PATENT DOCUMENTS

| | | | | |
|---|---|---|---|---|
| 5,799,488 | A * | 9/1998 | Truong | C05F 1/005 47/1.01 R |
| 2002/0032954 | A1* | 3/2002 | Vazquez-Perez | A01C 1/04 27/1 |
| 2008/0134575 | A1* | 6/2008 | Strand | C05B 17/00 47/48.5 |
| 2013/0014434 | A1* | 1/2013 | McGroarty | A01G 13/0243 47/32.8 |
| 2014/0274694 | A1* | 9/2014 | Rodriguez-Kabana | C05F 11/00 504/101 |
| 2016/0000002 | A1* | 1/2016 | Bibaud | A01C 1/046 47/56 |
| 2016/0200636 | A1* | 7/2016 | Roach | C05D 1/00 71/6 |
| 2016/0263403 | A1* | 9/2016 | Sawada | A61B 17/320068 |
| 2016/0296403 | A1* | 10/2016 | Brewer | A61G 17/08 |

* cited by examiner

PROCESS FOR PRODUCING A BIOCOMPATIBLE SOIL MIXTURE FROM CREMATED ASH REMAINS AND GROUND PENETRATING APPARATUS THEREFOR

FIELD OF THE INVENTION

The present invention relates to process for producing a biocompatible soil mixture from cremated ash remains and ground penetrating apparatus therefor.

BACKGROUND OF THE INVENTION

Cremated ash is sometimes used for planting a memorial or legacy tree. In this regard, crematoriums sometimes provide biodegradable urns containing the cremated ashes for such purpose.

However, we discovered that the chemical composition of cremated ash is harmful for plant growth and therefore not suited for legacy tree planting.

As such, a need therefore exists for a treatment process and resultant composition rendering cremated ash plant biocompatible so as to promote and enhance plant growth or at least have little detrimental effect thereon.

It is to be understood that, if any prior art information is referred to herein, such reference does not constitute an admission that the information forms part of the common general knowledge in the art, in Australia or any other country.

SUMMARY OF THE DISCLOSURE

We conducted laboratory studies to develop a process for producing a biocompatible soil mixture from cremated ash remains that could feed a legacy tree such that the long-term health of the legacy tree was not compromised.

The result of that scientific study is contained in a report entitled "Composition of deposited ashes for minimal impact on tree health" by Mary Cole PhD et al. of Agpath Pty Ltd, the entire contents of which are incorporated herein by reference.

In general terms, we devised a nutrient composition, which is mixed with cremated ash remains and a soil base, wherein the cremated ash is used in specific quantities determined from our study.

We also undertook studies to determine the chemical properties of cremated ash remains as compared to those required for plant biocompatibility determining that such was detrimental for plant health. As such, we therefore developed a microbial conditioner for adjusting the adverse cremated ash chemical properties such that the conditioned soil mixture was suitable for plant growth.

Specifically, the microbial conditioner utilises microbes to adjust the chemical properties of the cremated ash remains for biocompatibility. The microbial conditioner leverages soil biology and biological amendments to allow the microbial content to naturally adjust and balance the chemical adverse chemical properties of cremated ash remains. The microbial conditioner is utilised to balance the adverse chemical properties such as pH and phosphate, calcium and sodium levels of the cremated ash. The microbial conditioner assists soil biology to increase metabolism and associate the cremated ash with the natural environment more quickly and according to plant sensitivity.

As such, with the foregoing in, mind, in accordance with one aspect, there is provided a process for producing a biocompatible soil mixture from cremated ash remains, the process comprising: mixing cremated ash remains with a soil base material and a nutrient composition to produce a pre-conditioned mixture, the nutrient composition comprising at least one of paramagnetic material, soil conditioner and fertilizer; and conditioning the pre-conditioned mixture using a microbial conditioner to adjust the adverse chemical properties of the cremated ash remains biologically to produce a conditioned soil mixture being biocompatible for a legacy tree, wherein the pre-conditioned mixture comprises less than 10% of the cremated ash remains by volume.

The microbial conditioner may comprise all of kelp, Humic acid, Fulvic acid, molasses, a carbon source, water and microbial content.

The microbial conditioner may comprise at least one of kelp, Humic acid, Fulvic acid, molasses, a carbon source, water and microbial content.

The microbial conditioner may be used for adjusting the pH of the cremated ash remains.

Whereas the cremated ash remains may have a pH of between 10 and 12 the conditioner conditions the pre-conditioned mixture such that the conditioned soil mixture may have a pH of between 6 and 7 pH.

The microbial conditioner may be used for adjusting the phosphate levels of the cremated ash remains.

Whereas the cremated ash remains may have phosphates of between about 45-52% by volume the conditioned soil mixture may have less than 8% phosphates by volume.

The conditioned soil mixture may have less than 4% phosphates by volume.

The conditioned soil mixture may have less than 2% phosphates by volume.

The microbial conditioner may be used for adjusting the calcium levels of the cremated ash remains.

The microbial conditioner may be used for adjusting the sodium levels of the cremated ash remains.

The pre-conditioned mixture may comprise the cremated ash remains at about 5% by volume.

The pre-conditioned mixture may comprise the nutrient composition at about 7.5% by volume.

The pre-conditioned mixture may comprise the soil base material at about 90% by volume.

The soil base material may comprise at least one of commercial potting mix and compost.

The pre-conditioned mixture may comprise the potting mix at about 45% by volume and the compost at about 45% by volume.

The nutrient composition may comprise all of the paramagnetic material, soil conditioner and fertilizer.

The conditioner may be liquid form.

Conditioning the pre-conditioned mixture may comprise the saturation of the pre-conditioned mixture with the conditioner.

The microbial content enhances the growth of a bacteria.

The bacteria may comprise nitrogen fixing bacteria.

The bacteria may comprise Actinobacteria.

The bacteria may comprise Aerobes and anaerobes

The bacteria may comprise at least one of *Bacillus megaterium; Bacillus thuringiensis; Bacillus mucilaginosus; Bacillus subtilis* and *Bacillus licheniformis*.

The process may further may comprise populating the conditioner with the bacteria.

The process may further may comprise pre-processing the conditioner using at least one of a humification and fermentation process.

The microbial content enhances the growth of a fungus.

The fungus may comprise decomposing fungus.

The fungus may comprise mutualist fungus.

The process may further may comprise populating the conditioner with the fungus spores.

The process may further may comprise pre-processing the conditioner using a humification and fermentation process.

The conditioner may comprise total Kelp content of between 14% and 16%.

The conditioner may comprise total Humic acid content of between 19% and 21%.

The conditioner may comprise total Fulvic acid content of between 4% and 5%.

The conditioner may comprise total Molasses content of between 7% and 9%.

The conditioner may comprise total carbon content of between 19% and 21%.

The conditioner may comprise total Microbial and water content of between 19% and 21%.

The conditioner may comprise total Amino acid content of between 5% and 7%.

The conditioner may comprise total Protein content of between 5% and 7%.

The conditioner may comprise total Kelp content of about 20%.

The conditioner may comprise total Humic acid content of about 20%.

The conditioner may comprise total Fulvic acid content of about 5%.

The conditioner may comprise total Molasses content of about 8%.

The conditioner may comprise total carbon content of about 20%.

The conditioner may comprise total Microbial and water content of about 20%.

The conditioner may comprise total Amino acid content of about 6%.

The conditioner may comprise total Protein content of about 6%.

The conditioner may comprise a total Nitrogen content of between about 10% and 12%.

The conditioner may comprise a total Phosphorus content of about 0.20%.

The conditioner may comprise a total Potassium content of about 4.5%.

The conditioner may comprise a total Sulphur content of about 0.20%.

The conditioner may comprise a total Calcium content of about 0.24%.

The conditioner may comprise a total Magnesium content of about 0.90%.

The conditioner may comprise a total Iron content of about 0.60%.

The chemical composition of the nutrient composition may comprise about 11% organic carbon.

The chemical composition of the nutrient composition may comprise about 4.9% humate.

The chemical composition of the nutrient composition may comprise about 6.7% Calcium.

The chemical composition of the nutrient composition may comprise about 2.4% Magnesium.

The chemical composition of the nutrient composition may comprise about 2% Potassium.

The chemical composition of the nutrient composition may comprise about 0.1% Nitrogen.

The chemical composition of the nutrient composition may comprise about 0.8% Sulfur.

The chemical composition of the nutrient composition may comprise about 19.5% Silica.

The chemical composition of the nutrient composition may comprise about 2.0% iron.

The chemical composition of the nutrient composition may comprise about 0.10162% phosphorus.

The chemical composition of the nutrient composition may comprise about 0.065% manganese.

The chemical composition of the nutrient composition may comprise about 0.00067% zinc.

The chemical composition of the nutrient composition may comprise about 0.021% copper.

The chemical composition of the nutrient composition may comprise about 0.0038% boron.

The chemical composition of the nutrient composition may comprise about 0.0042% cobalt.

The chemical composition of the nutrient composition may comprise about 0.00084% nickel.

The soil conditioner may comprise a carbon geosequestration promoter.

The nutrient composition may comprise carbon geosequestration promoter Leonardite.

The nutrient composition may comprise Leonardite at between 5% and 10% by volume.

The nutrient composition may comprise Leonardite at about 11% by volume.

The fertilizer may comprise humates.

The humates may comprise at least one of fulvic and humic acids.

The at least one of fulvic and humic acids may comprise between 1% and 10% of the nutrient composition by volume.

The at least one of fulvic and humic acids may comprise about 5% of the nutrient composition by volume.

The paramagnetic material may comprise paramagnetic rock dust.

The paramagnetic rock dust may be at least one of volcanic, granite and basalt sourced.

There is also provided ground penetrating apparatus for ash nutrient infusion.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
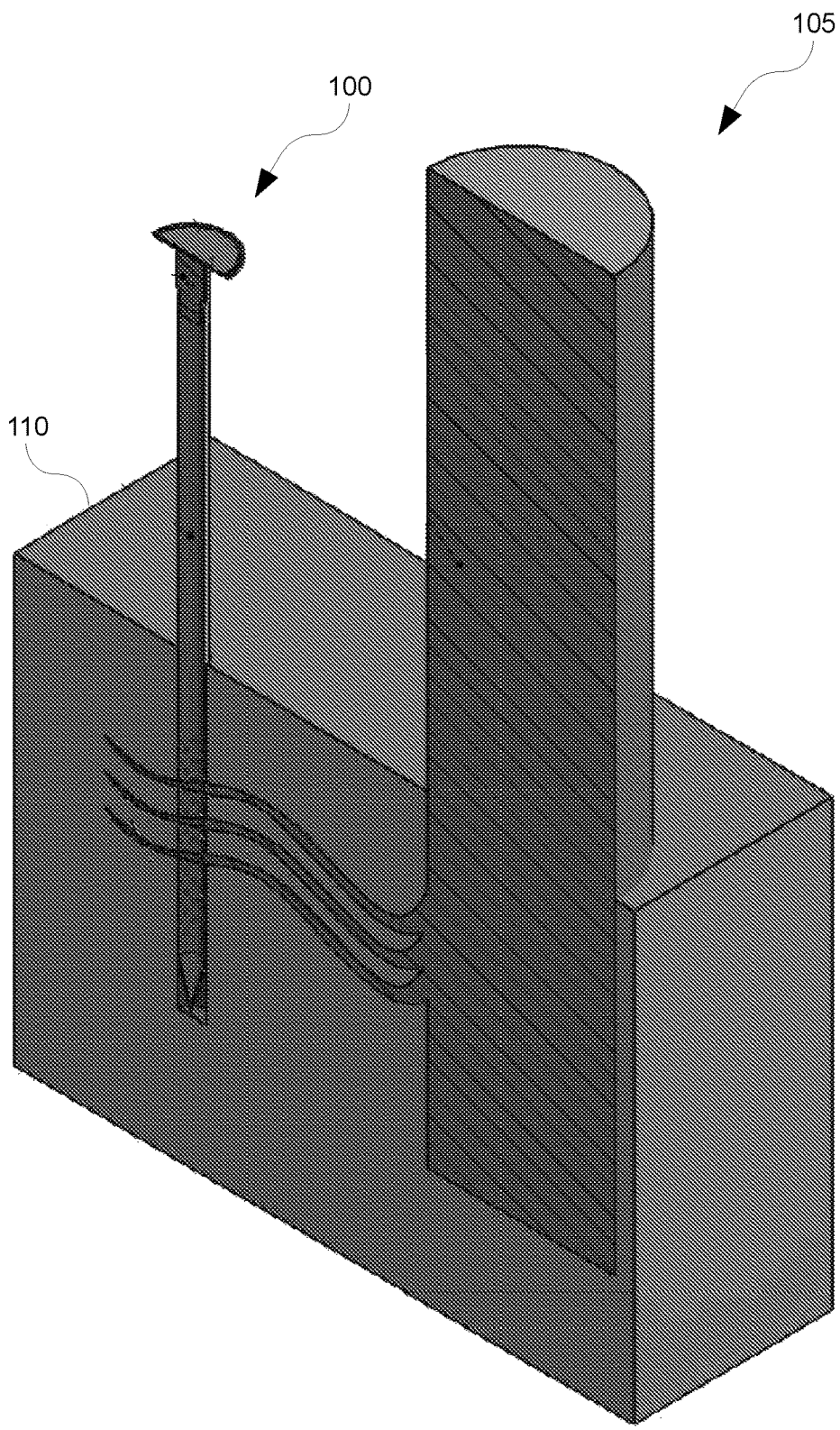
FIG. 1 shows a ground penetrating apparatus in situ adjacent a tree or the like so as to be adapted for providing nutrients to the tree or the like using ash nutrient of a deceased person in accordance with an embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

Before the structures, systems and associated methods relating to the process for producing a biocompatible soil mixture from cremated ash remains and ground penetrating apparatus therefor are disclosed and described, it is to be understood that this disclosure is not limited to the particular configurations, process steps, and materials disclosed herein as such may vary somewhat. It is also to be understood that the terminology employed herein is used for the purpose of describing particular embodiments only and is not intended to be limiting since the scope of the disclosure will be limited only by the claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterised by," and grammatical equivalents thereof are inclusive or open-ended terms that do not exclude additional, unrecited elements or method steps.

It should be noted in the following description that like or the same reference numerals in different embodiments denote the same or similar features.

Introduction

Our analysis of cremated remains concluded that whereas, the general composition of cremated ash depends on the conditions of cremation, all organic matter is destroyed. As such, whereas organic matter is required for soil and plant health, our study identified that cremated ash contains very little or no organic matter.

Furthermore, the chemical composition and pH of ash varies slightly depending on cremation conditions and life style and place of origin of the person. Our studies identified that cremated ash remains are alkaline having a pH of between approximately 10 and 12.

Furthermore, we determined that most trees perform well in slightly acidic soils (pH 6-6.5) which provide the most favourable environment for nutrient availability. Alkaline soils may contain adequate nutrients to support plant growth, but the chemistry (pH) of these soils may be such that the nutrients are not available for uptake by roots of affected plants resulting in nutrient deficiencies. Deficiencies of some nutrients lead to reduced chlorophyll production resulting in stunted growth and decline. Nitrogen is one nutrient that is depleted most rapidly from the soil and needs regular replacement.

The inorganic compounds may remain as a little carbonate (most of the carbon is removed as oxidising gasses), phosphates, chlorides and sulphates or oxides while most of the organic compounds are converted to metal oxides.

We identified that human cremated ash is high in sodium, being 200 to 2000 times higher than plants can tolerate. Human cremated ash is rich in phosphates, calcium, potassium and sodium, all of which are not in the balance required by plants for healthy growth. The excess of calcium impacts on water control and photosynthesis and this can manifest as browning, scorching and spotting of leaves.

In the study, it was further identified that cremated ash has salt levels 22 times higher than plants can generally tolerate. Salt contamination can stunt or kill trees depending on species sensitivity, environmental variables such as soil physical and chemical properties, precipitation, light exposure and concentration of the contamination.

Furthermore, Cationic Exchange Capacity (CEC) of soil is negative change existing on soil particles that hold positively charged cations against leaching. Organic matter and most clays have a high CEC while sands are low. The CEC is important in plant health and will be affected by the cremated ash included with the tree.

As such, because of the study, we developed a liquid microbial conditioner to adjust the adverse chemical properties of the cremated ash remains microbially. In embodiments, the liquid conditioner contains selected Kelp (mainly bull kelp), Humic acid; Fulvic acid; Molasses; Carbon content, water and microbial content that adjusts the adverse chemical properties of cremated ash biologically to a biocompatible form that will allow the growth of trees.

Furthermore, we also developed the nutrient composition comprising at least one of paramagnetic material (that is paramagnetic usually volcanic, granite or basalt sourced), soil conditioner and fertilizer, which, in embodiments, contains Igneous rock; Leonardite; Dolomite Lime (specialised); Micro-nutrients and water.

Trial and Experimentation

Our studies comprised obtaining human and animal (household pet and bovine) cremated ash remains and performing plant growth studies utilising differing soil mixture as compared to controls.

The cremated ash remains were analysed wherein we concluded that cremated ash remains contain high amounts of phosphates (45-52%); calcium (25%) and sodium (1-1.5%) with pH in the range 11-12.5.

Furthermore, to determine the appropriate percentage of ash suitable for the conditioned soil mixture, several trials were conducted wherein differing percentages of the cremated ash where mixed with soil base material base (such as comprising commercial potting mix and/or compost) to ascertain ideal dilution ranges. Initial ash percentages were 10%, 20%, 40%, 50%, 60% and 80% with controls of zero ash and 100% ash were analysed. Further trials used ash at 1%, 3%, 5%, 7-8% with controls of zero and 100%.

Furthermore, to address the alkalinity of the cremated ash remains, several acids and commercial products were considered for lowering pH of the cremated as follows:

| Name of product | pH when used at recommended label rate |
| --- | --- |
| Vinegar | 2.45 |
| Buffered vinegar | 3.91 |
| Khumate ™ | 10.8 |
| Compost | 6.78 |
| Commercial potting mix | 6.00 |
| Dynamic lifter fertiliser | 6.6 |
| Soil Charger | 6.41 |
| Lignite | 4.13 |
| Fulvic Acid | 3.5 |
| Salt-Away | 6.06 |

In the above table, the conditioner is the conditioner of present embodiments developed during our study. In some trials the mixture was adjusted into the acidic range using vinegar and other commercially available products and trialled along with unconditioned mix but with the ash concentrations the same as above.

Species from widely different plant groups were tested including
 a. Black Wattle—*Acacia mearnsii;*
 b. White Stringybark—*Eucalyptus globoidea;*
 c. *Pittosporum tenuifolium* 'Tasman Ruffles';
 d. conifer—*Cupressus macrocarpa* 'Wilma';
 e. Portugal Laurel—*Prunus lusitanica* syn *laurocerasus;* and
 f. Silver birch—*Betula pendula.*

Trial 1

Twenty each of *Acacia mearnsii* and *Eucaiptus globoidia* were used.

Compost provided the soil base material. A 50/50 V/V solution of vinegar and phosphate buffer was used to reduce the pH of the ash to a plant tolerant level.

Ash concentrations of 10%, 20%, 40%, 50%, 60% and 80% cremated ash were chosen together with controls of compost only, pH conditioned cremated ash and unconditioned cremated ash. Pot volume of 150 mLs was used for each ash/compost mix and pH recorded below:

| % Ash | mLs V/V vinegar/$PO_4$ | pH |
| --- | --- | --- |
| 80 | 12.5/4 | 5.69 |
| 60 | 16.5/3.5 | 5.49 |
| 50 | 20/5 | 5.31 |
| 40 | 25/25 | 2.11 |
| 20 | 50/50 | 4.72 |
| 10 | 100 | 4.43 |

*Acacia mearnsii* and *E. globoidia* were planted into tubes with the appropriate ash/compost mix and controls and left to grow in the open air so as to mimic the final environment.

The plants were monitored every other day and photographed for a record of their reaction to the potting mix of cremated ash and compost mixes.

Trial 2

From observations in Trial 1, it was found that the ash set like concrete at higher concentrations and that larger pots were required to allow for more root growth and greater volume of mix. Limitations on the volume of ash influenced the design of each trial. Ash concentrations of 30%, 50%, and 60% with controls of 100% potting mix, 100% unconditioned ash and 100% conditioned ash were chosen using the same plant species and the same amending solution of 50/50 V/V Vinegar/phosphate buffer. Thermal aerobic compost was replaced with commercial potting mix.

These plants were allowed to grow on and were photographed each couple of days and notes on changes recorded at the same time.

Trial 3

Observations of plants in trial 1 & 2 suggested that the carbon:nitrogen ratio was not compatible with that required for good plant growth so a third trial was set up with the mix containing further nutrients.

This recipe contained bovine ash, soil base material comprising commercial potting mix, and nutrient composition comprising soil conditioner & fertiliser (11% C-carbon); slow release pellets with trace elements (a few grains per pot) watered in with 10% solution of conditioner (12-14% nitrogen and 1% carbon). Cremated ash concentrations of 30%, 40% and 60% with controls of 100% potting mix and 100% conditioned ash (Table 2.3). Five pots of each concentration with control were used. To test stability of amendment, pH readings were taken immediately and after 24 hours. Table 2.3. 'Dolly' Volumes, weights and pH values for trial 3.

| % ash | gm ash | gm potting mix | gm Soil Charge | pH | pH after 24 hours |
| --- | --- | --- | --- | --- | --- |
| 60 | 225 | 100 | 50 | 7.20 | 8.32 |
| 40 | 140 | 160 | 50 | 7.06 | 7.92 |
| 30 | 100 | 183 | 50 | 6.33 | 7.3 |
| Control 0% ash | 0 | 250 | 50 | 4.59 | 5.4 |
| Conditioned 100% | 500 | — | watered with conditioner | 9.87 | 12.17 |

Trial 4

Ash volume was limited and further species were trialled. *Pittosporum tenuifolium* 'Tasman Ruffles' was planted in 0%, 3% 7.5% and *P. tenuifolium* was planted in 1% and 5% ash. Conifer, *Cupressus macrocarpa* 'Wilma' was planted in 0%, 1%, 3%, 5% and 7.5-8% bovine ash. Mixed native species, *Eucalyptus globiodea* was planted in 0%, 3% & 7.5-8% ash and *Acacia mearnsii* was planted in 1% & 5% ash. Recipe trialled was 45% potting mix, 45% compost, 50 gm/pot Soilcharge, and watered to run off containing 10% conditioner

| % ash | gm ash | gm potting mix | gm compost | gm Soil Charge | pH |
| --- | --- | --- | --- | --- | --- |
| 1 | 8 | 371 | 371 | 50 | 6.04 |
| 3 | 24 | 363 | 363 | 50 | 6.22 |
| 5 | 40 | 355 | 355 | 50 | 6.50 |
| 7-8 | 62 | 344 | 344 | 50 | 6.64 |
| Control 0% | 0 | 375 | 373 | 50 | 6.02 |

Trial 5

Two more species of European deciduous plants, *Prunus lusitanica* syn. *Laurocerasus Lusitanica* were planted in 0%, 1%, 3%, 5% & 7.5-8% ash. *Betula pendula* were planted in 0%, 1%, 3%, 5% & 7.5-8% ash. These species were introduced using the potting recipe from Trial 3.

All the plants were watered when required with a 10% solution of conditioner to run-off providing on-going supply of nitrogen and carbon.

Trial 6

A known amount of bovine cremated ash was weighed; a known volume of water was added, stirred well and pH recorded. The same amount of bovine cremated ash was weighed and the same volume of a commercial product, Salt-Away® was added, stirred and pH recorded. Both solutions were left to stand for 48 hours before pHs were again recorded to determine if the commercial product leached any salt from the cremated ash.

Trial 7

A known amount of bovine cremated ash (200 gm) was weighed; a known volume of water (800 mL) was added, stirred well and pH recorded. This volume was heated gently for several hours to determine if heating in water of pH less than 7.0 would draw the salt from the cremated ash. Salinity reading was taken before and after boiling.

Trial 8

This trial established the recipe that was to be used for a trial burial at a cemetery. The plants selected were *Eucalytpus camaldulensis*, river red gum; *Eucalyptus viminalis*, manna gum; *Acacia dealbata*, silver wattle; *Acacia melanoxylon*, Australian blackwood.

Ash concentrations of 0%, 3%, 5%, 7.5% and 15% were used and incorporated into a mix of 45% commercial potting mix, 45% good compost (soil in a real situation), 7.5% Soil Charge and watered to appropriate moisture using 10% conditioner. Sixty 150 mm pots were planted and photographed regularly.

Trial 9

Human ash was used at 5%, 10%, 15% and 0% in 140 mm pots.

Trees selected for the ashes were 6× Grevillea ivanhoe, 4× Eucalyptus viminalis, 2× Eucalyptus citriodora, 6× Banksia serrata, and 6× Grevillea towera.

The ash had a pH of 12.2 in 1:5 dilution. One hundred and forty mm pots were used which held 800 gm of mix. The recipe was 45% commercial potting mix, 45% good compost or soil, 7.5% Soil charge, watered to run-off using 10% conditioner (10-12% N)

| % ash | gm ash | gm potting mix/soil |
|---|---|---|
| 5 | 40 | 760 |
| 10 | 80 | 720 |
| 15 | 120 | 680 |
| Control 0% | 0 | 800 |

Trial Results—Cremated Ash pH.

Cremated ash from pets, bovine, and two humans of Estonian origin were tested in water for pH at 1 gm in 9 mLs dilution wherein the alkalinity measured as follows:

| Origin of cremated ash | pH in water |
|---|---|
| Human 1 | 10.20 |
| Human 2 | 11.89 |
| Bovine | 11.34 |
| Dog | 11.27 |
| Cat | 10.91 |
| Human 3 | 12.21 | pH of Remediating Products.

Several products were used to reduce and stabilise pH to a level that was acceptable for healthy plant growth wherein the table below gives the results of pH of the products diluted to label rate in water:

| Name of product | pH when used at recommended label rate | Actual concentration used at label rate |
|---|---|---|
| Vinegar | 2.45 | concentrate |
| Buffered vinegar | 3.91 | Buffer phosphate 1:1/vinegar |
| Khumate ™ | 10.8 | 50 gm/L; (0.75 mL/150 mL) |
| Compost | 6.78 | 1 gm in 9 mL water |
| Commercial potting mix | 6.00 | 1 gm in 9 mL water |
| Dynamic lifter fertiliser | 6.6 | 1 gm in 9 mL water |
| Conditioner (of present embodiments) | 3.08 | 10% in water |
| Soil Charger | 6.41 | 1 gm in 9 mL water |
| Lignite | 4.13 | 1 gm in 9 mL water |
| Fulvic Acid | 3.5 | concentrate |
| Salt-Away | 6.06 | concentrate |

Trial 1

Acacia and Eucalyptus species planted into tubes died in a few days regardless of whether the ash was conditioned or not for pH.

Duplicate pots were set up. The high concentrations of cremated ash set like concrete in the tubes.

Plants were not seen to recover from potting shock so death could not be attributed clearly to pot shock or salinity because the controls died as well as the trial plants.

Trial 2

Trial 2 was similar to trial 1 except that larger pots were used to allow for more root growth space and a larger amount of organic material around the roots. Acacia species and Eucalyptus species plants did not survive.

It could not be determined if the plants died from pot shock or salinity. As the controls again died, pot shock may have been the cause. Cremated ash used in this trial was received, washed and dried for reuse. Availability of cremated ash limited the number of replications and plant species that could be trialled at any one time.

It was apparent that the carbon:nitrogen availability in the potting mix used was not sufficient to support plant growth. This lack was addressed in the following trials.

Trial 3

Trial 3 was set up in larger pots using buffered vinegar to adjust the pH of the cremated ash.

Thermal aerobic compost was used as the potting substrate. Compost with potting mix and amendments added further nutrients to the mix. In this trial, the controls (without ash) survived and the trial pots with the high concentration of ash died.

Acacia mearnsii leaves in the controls without ash were yellow suggesting that the nitrogen levels were still not correct.

A ratio of 4-10:1 would be useful although compost can be 30-40:1. The compost/potting mix used is 'finished' so should be in the lower ratio. The trial plants died.

Trial 4

With limited ash, replicates were not possible and representative concentrations were used to cover growth ranges where possible. Cyprus and a Pittosporum species were also tested.

The higher concentrations of ash were now obviously too high so the decision to use ash at less than 10% proved successful.

This trial used as concentrations from 1 to 7-8%. The lack of replications again made it difficult to determine plant deaths but growth at each of these concentrations of ash appeared successful.

The Pittosporum at 7.5-8% ash died so it has to be assumed only that 7.5-8% ash is not suitable for that plant species. Eucalyptus species plants grew satisfactorily. Where there was leaves showing nutrient deficiency after a couple of weeks, new leaves grew which were healthy and thriving. The loss of leaves initially could have been pot shock or some period of adjustment to the presence of the ash.

The Acacia species plants continued to show some nitrogen deficiency so that still needed addressing in future trials. It was the control that died and no explanation can be given.

Trial 5

Two European deciduous plant species were trialled with ash at 1% to 7-8% with a control of 0% ash where again replicates could not be used because of lack of ash volume. There was still an issue with the carbon:nitrogen ratio and Prunus appeared to be very sensitive to any volume of ash. It could be that the potting was too stressful so the composition of the mix cannot be completely the only cause. Of healthy Prunus plants planted only those having 5% ash survived to 103 days.

Photographs were taken of all the plants in December and it was apparent that many were healthy and thriving. Where there was an initial set back in plant health, a settling period showed an adjustment to the new soil mix conditions. The final recipe containing conditioner was established based on these results. By January 2016 the plants were very healthy and growing well.

Trial 6

Salinity and pH of the product, Salt-Away®, had little impact on the pH or salinity of cremated bovine ash.

Values for pH taken immediately after mixing with Salt-Away®, and then after 48 hours standing un-agitated show similar pH readings as can be seen in Table 3.4. The cost of Salt-Away® and the minimal amount of salt removed over 48 hours, would suggest the product is not suitable in removing salt from cremated ash.

| Description | pH | | Salinity gm/100 g | |
|---|---|---|---|---|
| | Time zero | 48 hrs soaking | Time zero | 48 hrs soaking |
| Salt-Away only | 6.06 | 6.22 | 3.4 | 3.4 |
| Ash (20 gm) + water (20 mL) | 11.92 | 12.55 | 1.0 | 1.4 |
| Ash (20 gm) + Salt-Away (20 mL) | 9.25 | 12.55 | 4.4 | 4.4 |
| Water only | 7.62 | 6.45 | 0 | 0 |

Trial 7

Boiling bovine cremated ash boiled in water did not change the pH and, therefore, did not contribute to any leaching of salt from the ash. The ash was recovered and dried. Table 3.5 shows that the salt cannot be boiled from the ash.

| WtAsh | Volume water | Salinity water | Salinity ash + water before boiling | Salinity ash + water after boiling |
|---|---|---|---|---|
| 200 gm | 800 mL | 0.00 | 0.6 gm/100 gm | 0.6 gm/100 gm |

Trial 8

The four tree species in this trial developed well after establishing through pot shock and transplant stock.

The *Acacia* species showed loss of chlorophyll in the apical leaves. This is nitrogen imbalance and lack of adequate nitrogen-fixing bacteria in the recipe.

One of the *Acacia* species was planted outside the laboratory and it established well and recovered leaf colour within 2 weeks of planting into soil. The pot trials showed that *A. melanoxylon* is a more robust Acacia species than is *A. dealbata*.

*A. dealbata* is a primary coloniser and as such has a life generally around 15 years. *A. melanoxylon* is a long-lived species giving a beautiful canopy with wood that is prized by furniture makers.

Trial 9

Human ashes were used in the recipe that became the final recipe. All trees grew successfully. *Grevillea* and *Banksia* species were chosen by her family for suburban environments.

Trial Result Analysis

As a result of our trials, we concluded that all organic matter is removed leaving the chemical elements in the form of phosphates, chlorides and oxides with a pH range (for human remains used in this project) between 10.20 and 11.89. Other mammalian ash used from cat, dog and cattle which gave pH values of 10.91, 11.27 and 11.34, respectively.

The chemical composition of human ash from crematoria show phosphate levels of to 52.2%, calcium of 25.3%, sodium of 1.12% chlorides of 1% and sulphate of 11% which many other elements of less than 1%.

The sodium level alone can be 200 to 2000 times higher than plants can tolerate. Any carbon-based matter is evaporated during the process of cremation generally at temperatures in the order of 800-1050° C. The remaining ash does not contain carbon or nitrogen which are essential for plant growth. The balance of elements remaining will not support plant growth without amendment.

As such, a microbial conditioner was developed that would assist in the biological conversion of the ash to a plant friendly and available form of composition.

Furthermore, a second dry nutrient composition containing paramagnetic rock dust, soil conditioner and fertiliser certified organic was developed making up the two-part components of the recipe providing an environmentally compatible product for delivering the human ash to the ground and the tree chosen to be planted by family or the deceased.

The high pH of the ash needed to be neutralised so several methods were trialled using commercial products. The ash was mixed with vinegar as the concentrate, phosphate buffered vinegar 1:1, Khumate™ at 50 gms/L, Salt-Away as the concentrate and fulvic acid as the concentrate. None of these products delivered a stable dilution of the pH although all except the Khumate™ were acidic and dropped the pH of the ash into a range possible for plant growth. However the effect was not stable over time and all were abandoned during the course of the trials.

Initial trials use the cremated ash at 10%, 20%, 40%, 50%, 60% and 80% ash content with a control at 100% ash. The ash was mixed into a series of materials such as commercial potting mixes, commercial composts and high quality homemade compost. The paramagnetic rock dust product was added into the mix and watering was done with either water or, later, conditioner.

Early trials were carried out using *Acacia mearnsii* (black wattle) and *Eucalyptus globoidea* (white stringybark) donated by Adele Richardson, Westernport Indigenous Nursery, Tynong. These trees died at ash concentrations of 20% and above. The 100% ash control and 80% ash set like concrete in 24 hours.

Later trials were carried out with ash concentrations of 1%, 3%, 5%, 7-8% with controls of zero ash. More species were added: *A. mearnsii* (black wattle); *E. globoidea* (white stringybark); *Pittosporum tenifolium* (Tasman Ruffles); *Cupressus macrocarpa* (Wilma cupress); *Prunus lusitanica* syn *laurocerasus* (Portugal Laurel) and *Betula pendula* (Silver Birch); *Grevillea* sp var. *towers*; *Grevillea* sp var. *Ivanhoe, Eucalyptus viminalis; Eucalyptus citriodora* and *Banksia serrata*.

It was found that those species which grew naturally in alkaline soils survived higher ash concentrations than those that grew in neutral to acid soils. For example, the Silver Birch, *B. pendula*, grew rapidly and strongly at 7-8% ash.

Preferred Composition for the Biocompatible Soil Mixture

In light of the above trial and experimentation and result analysis, a preferred position for the biocompatible soil mixture comprises approximately:

a. Cremated ash: 5%;
b. Commercial potting mix: 45%;
c. Compost: 45%;

d. Nutrient composition formulation: 7.5%;
e. Saturation of the above with microbial conditioner of present embodiments: 10%

Microbial Conditioner

In a preferred embodiment, the microbial content comprises:
a. Kelp (mainly bull kelp): 5%;
b. Humic acid: 20%;
c. Fulvic acid: 5%;
d. Molasses: 8%;
e. Carbon: 20%;
f. Water/microbial content: 20%;
g. Amino Acid: 6%;
h. Protein: 6%

The microbial content encourages the growth of microbes (bacteria and fungus) so as to adjust the adverse chemical properties of the cremated ash.

In one embodiment, rather than relying on the naturally occurring microbial content, the microbial content is provided wherein bacteria and/or fungus spores are introduced to the microbial conditioner prior to use such that such provided bacteria and fungus propagates.

Furthermore, to encourage the growth and/or propagation of the microbial content, the microbial conditioner may be subject to a humification process comprising fermenting the microbial conditioner at various temperatures to enhance the spectrum of the microbial content. Such a process may additionally entail the addition of minerals, natural hormones and amino acids.

The types of bacteria used may comprise nitrogen fixers that extract nitrogen gas from the air and convert it into forms that plants can use, and can add the equivalent of more than 100 kg/ha per year of nitrogen to the soil. Rhizobium bacteria live in special root nodules on legumes and can be inoculated onto legume seeds. Other free-living nitrogen-fixing bacteria associate with non-legumes, but inoculating with these organisms has not proved effective in increasing nitrogen fixation for non-legume crops.

Furthermore, actinobacteria may be used to help to slowly break down humates and humic acids in soils. Actinobacteria prefers non-acidic soils with pH higher than 5.

Furthermore, aerobes and anaerobes may be used. Aerobic bacteria needs oxygen, and dominate in well drained soil. Anaerobic bacteria do not need oxygen, and favour wet, poorly drained soils.

Specific types of bacteria may be introduced including *bacillus megaterium* that a strong ability to decompose lecithin, calcium phosphate and phosphor tricalcium. The bacteria changes animal and plant remains in the soil into phosphorus salt and those minerals readily available for fast uptake for plants to use for healthy growing. Phosphorus is one of the three major or primary nutrients for plants that were originally rich in the soil. However, most agricultural soils have a lack of phosphorus nutrients because the element is mostly in the organic state which is hardly dissolved and remains as an inorganic substance. Coupled with this is the practice of using phosphate fertilisers in large amounts in search of high yields. This leads to more phosphorus compounds sitting undissolved in the soil. The *Bacillus* species have a phosphorus decomposing effect promoting the dissolvability of the inorganic elements. Bacillus megaterium therefore is of great assistance to improve the utilisation of the phosphorus element in the soil for increased and healthy plant growth.

*Bacillus thuringiensis* may also be introduced on account of it having a strong ability to decompose organic nitrogen components in the soil. It is widely known for its defensive and offensive capacities against soil and plant pathogens.

*Bacillus mucilaginosus* may also be introduced on account of it being a silicate bacterium species which specialises in decomposing potassium minerals, releasing potassium and boosting azotification. The bacteria metabolize and cause the production of organic acids, amino acids, amylose and hormones for plant utilisation.

*Bacillus subtilis* may also be used for its capacity to multiply quickly in the soil. It has a strong capacity to produce proteinase, diastase and pectase. It is the major *Bacillus* that decomposes animal and plant remains into available nitrogen in the soil. Thus *Bacillus subtillis* frees up soil nutrients in both soil and air for plant use.

*Bacillus licheniformis* may also be introduced. This facultative anaerobe bacteria proliferates in soil. It is capable of decomposing protein and lignin to provide nutrition for plants in forms such as amino acids. It can effectively decompose organic matter in the soil and thereby provides nutrition for the growth of plants.

Furthermore, types of fungus that may be introduced include decomposers that are essential for breaking down woody organic matter and play an important role in immobilising and retaining nutrients in the soil. The organic acids they produce help create soil organic matter that is resistant to degradation.

Furthermore mutualist-type fungi may be used to develop mutually beneficial relationships with plants. Mycorrhizal fungi are the best known, and grow inside plant roots. Arbuscular mycorrhiza (VAM) are the most common, especially in agricultural plant associations. These fungi have arbuscles, growths formed inside the plant root that have many small projections into root cells, as well as their hyphae outside the root. This growth pattern increases the plant's contact with the soil, improving access to water and nutrients, while their mass of hyphae protects roots from pests and pathogens.

The chemical composition of the microbial conditioner may comprise:

| | |
|---|---|
| Total Nitrogen | 12% |
| Total Phosphorus | 0.20% |
| Total Potassium | 4.5% |
| Total Sulphur | 0.20% |
| Total Calcium | 0.24% |
| Total Magnesium | 0.90% |
| Total Iron | 0.60% |
| Plus trace elements | |

Nutrient Composition

In a preferred embodiment, the nutrient composition comprises:
a. Igneous rock
b. Leonardite
c. Dolomite Lime (specialised)
d. Micro-nutrients
e. Water On dry weight % basis the nutrient composition may comprise 11% organic carbon, 4.9% humate, Calcium 6.7%, Magnesium 2.4%, Potassium 2%, Nitrogen 0.1%, Sulfur—0.8%, Silica 19.5%, iron 2.0%, phosphorus 0.10162%, manganese 0.065%, zinc 0.0067%, copper 0.021%, boron 0.0003%, cobalt 0.0042%, nickel 0.00084%.

Method of Planting

Furthermore, the preferred method for legacy tree planting utilising the above nutrient composition and conditioner comprises:

a. Obtaining a tree/sapling for planting;
b. Soaking roots in the microbial conditioner for minimum of one hour (1 hr), preferably over night before planting to moisten root ball and energise plant;
c. Keeping tree roots cool and moist prior to planting;
d. Planting in properly drained soil;
e. Site preparation comprising:
  i. Digging a hole for planting, preferably being a minimum of 50cm deep×50 cm diameter hole or twice the root ball;
  ii. Saving the soil dug from the hole;
  iii. Pouring 20 l water into the hole prior to planting;
f. Mixing the nutrient composition with 10 kg of soil from the hole, 10 kg of good quality compost/potting mix (soil base material) and 3 kg cremated ash to form a pre-conditioned mixture;
g. Inserting the tree into the hole and hole upright while filling with the pre-conditioned mixture;
h. Using the extra soil from the hole for levelling if required;
i. Watering around the base of the tree with the liquid conditioner; and
j. Watering the tree six months after planting with the conditioner at 10% solution.

Ground Penetrating Apparatus for Ash Nutrient Infusion

There is also provided apparatus for infusing a tree or the like with nutrients from the cremated remains of a deceased person which may allow for the direct infusion of the roots of the tree or the like with the nutrients from the deceased person.

The diffusion apparatus may be charged with the conditioned soil mixture described above so as to allow direct infusion to an already established tree.

Referring to FIG. 1, there is shown a perspective view showing the ground penetrating apparatus 100 for ash nutrient infusion in situ. As is shown, the apparatus 100 has been inserted into the ground 110 so as to provide nutrients for the roots of the tree 105 or the like.

In this manner, the roots of the tree may draw nutrients from the apparatus 100 either directly from within the apparatus 100 or from the surrounding soil of the apparatus 100 into which the ash nutrient has seeped.

Figure 3:
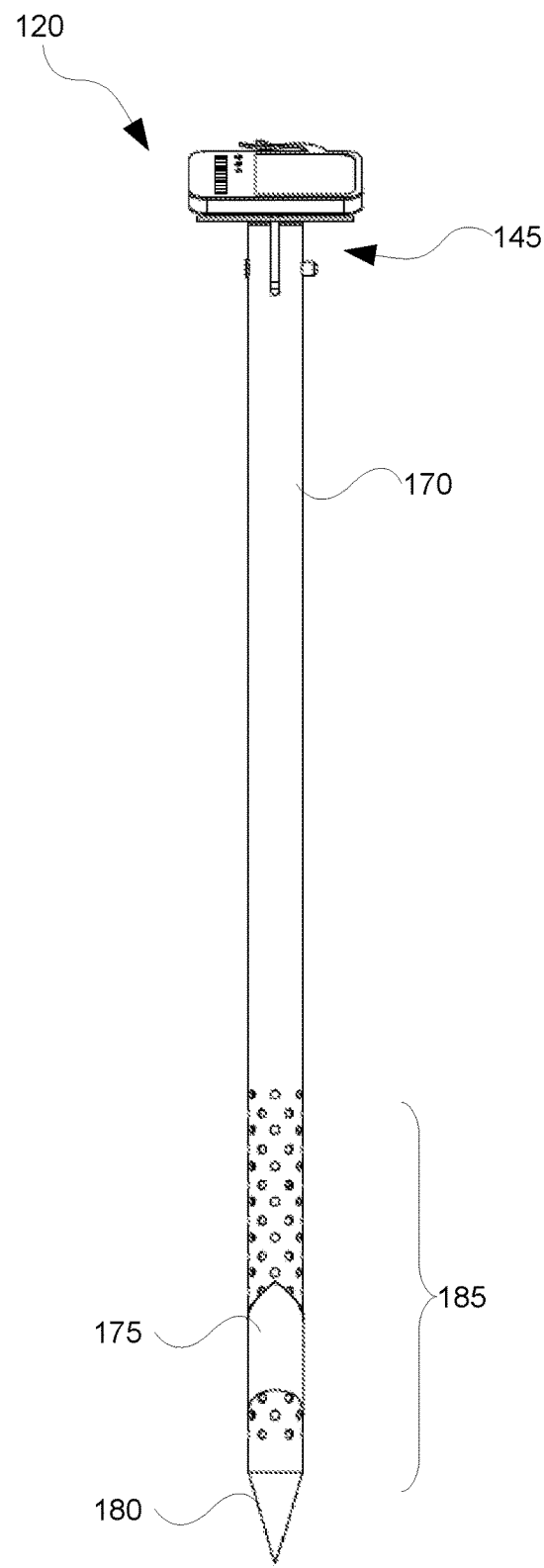
FIGS. 3 and 4 show elevation views of the apparatus in accordance with embodiments of the present disclosure.
Figure 4:
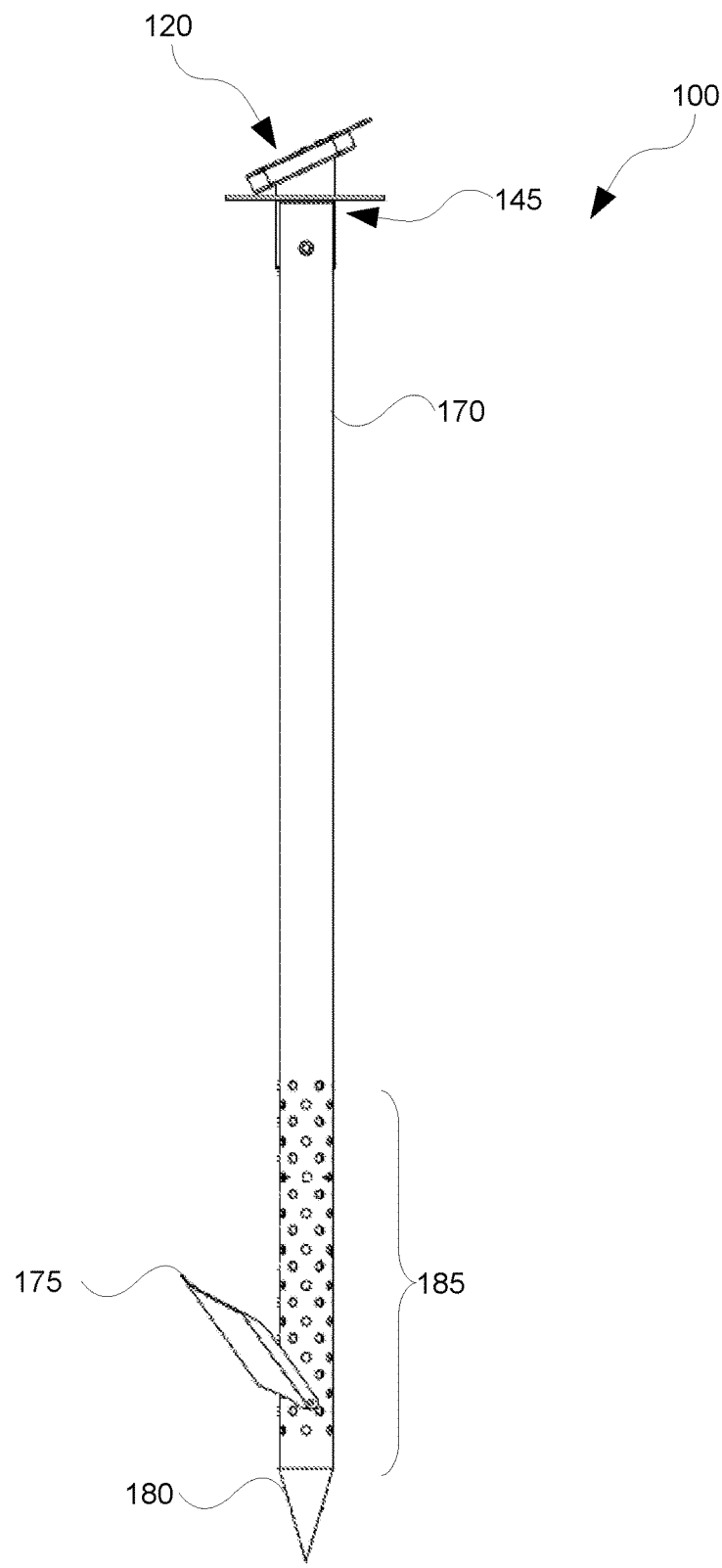
Figure 5:
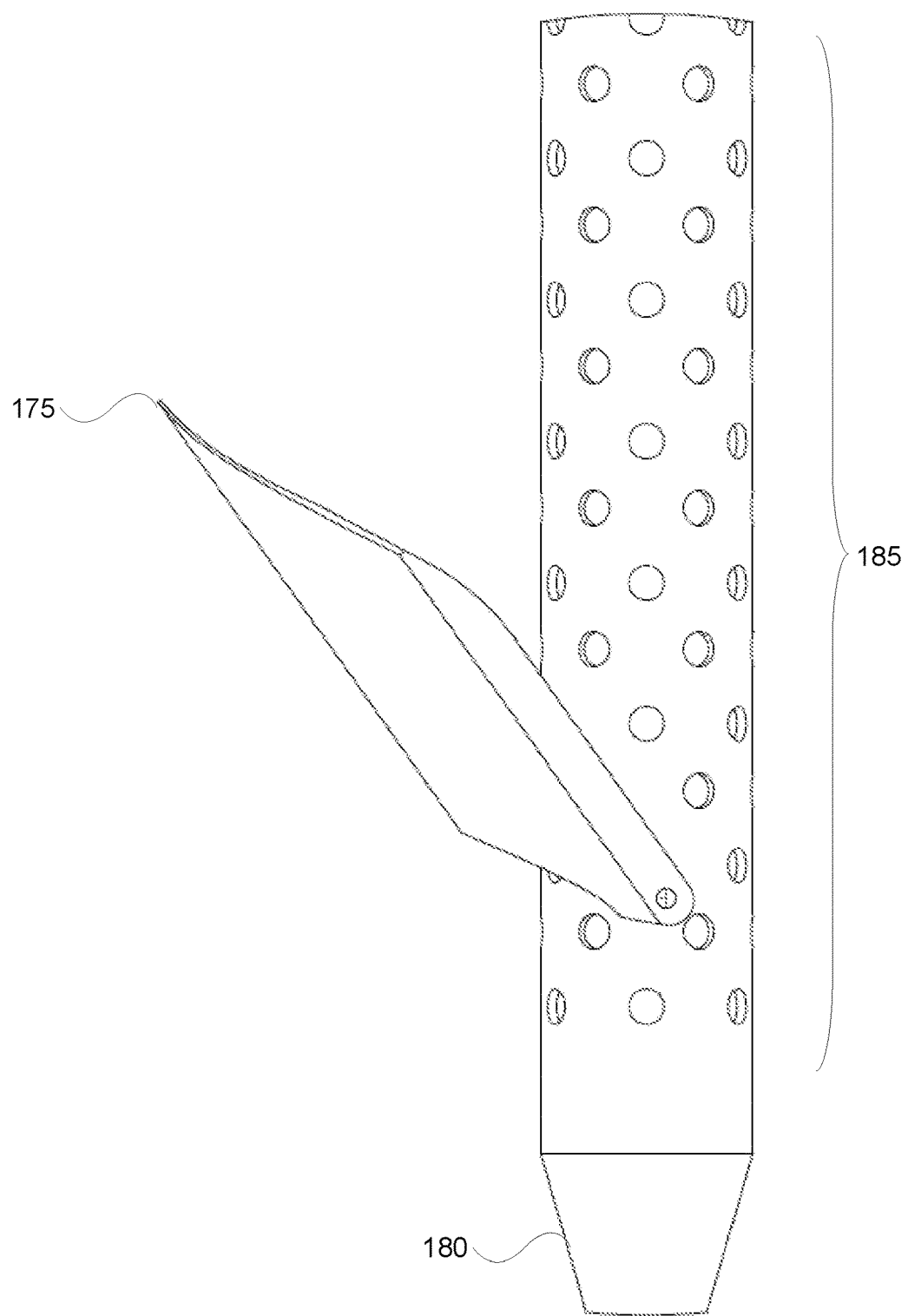
FIG. 5 shows a magnified view of a distal end of the apparatus showing the nutrient permeable portion and the locking flange in further detail in accordance with an embodiment of the present disclosure.

Specifically now, referring to FIGS. 3 and 4, there is shown elevation views of the ground penetrating apparatus 100 in further detail. As can be seen, the apparatus 100 comprises a substantially elongate and hollow body 100 comprising an opening 145 for receiving the ash nutrient therein. The body 170 further comprises a nutrient permeable portion 185.

As such, in use, the apparatus 100 is adapted for being driven into the ground 110 substantially adjacent a tree 105 or the like, receiving the ash nutrient, being the cremated remains of a deceased person via the opening 145 and infusing the tree 105 or the like with nutrient from the ash nutrient via the nutrient permeable portion 185.

In the embodiment shown, the nutrient permeable portion 185 is provided by a plurality of apertures within the body 170 of the apparatus. However, it should be appreciated that in other embodiments other arrangements may be employed within the purposive scope of allowing the ash nutrients to infuse the surrounds of the apparatus 100 or to allow the ingress of roots of the tree 105 or the like within the interior of the body 170 of the apparatus 100.

Figure 2:
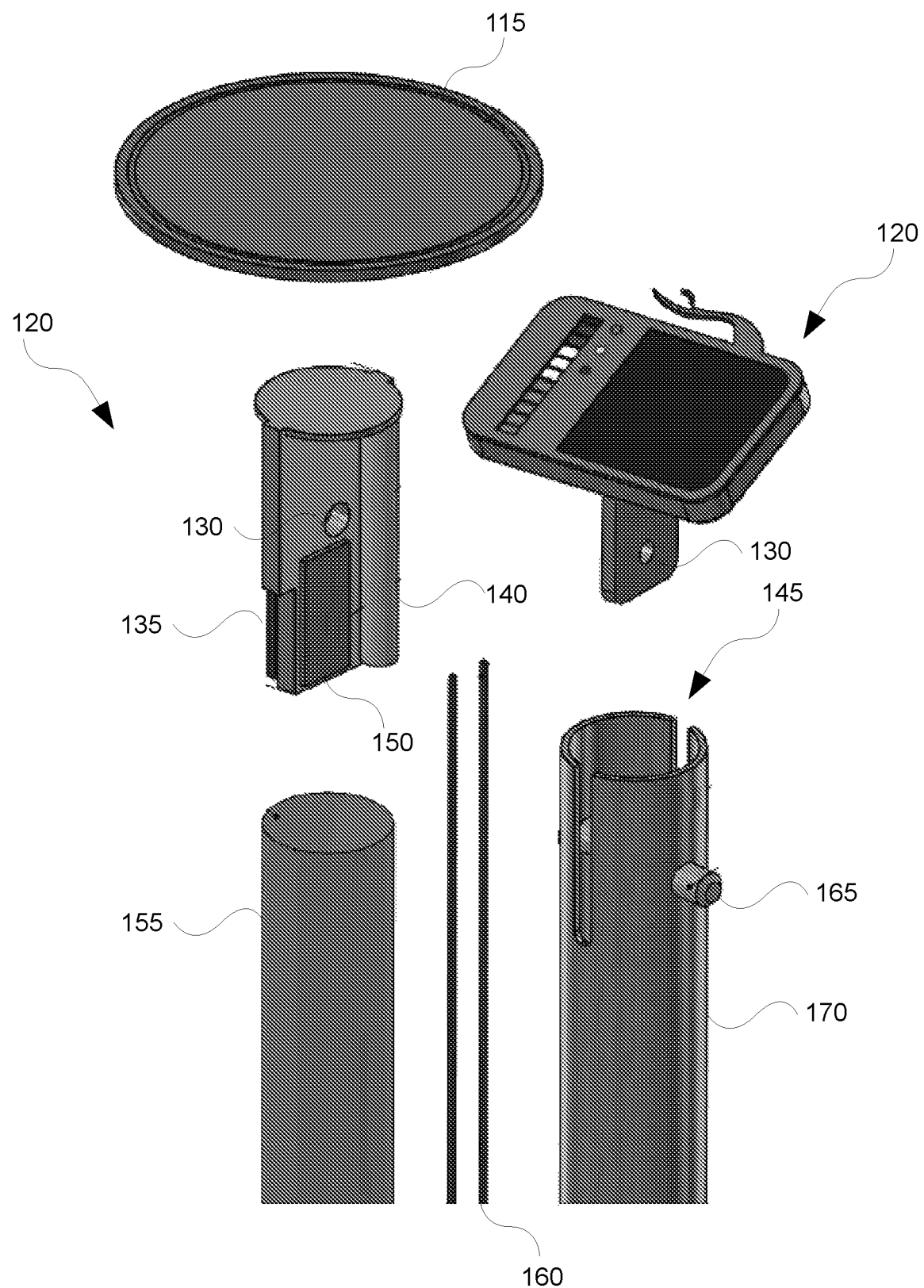
FIG. 2 shows numerous components of the apparatus including a computing device adapted for performing various computational tasks described herein in accordance with embodiments of the present disclosure.

In embodiment, and referring to FIG. 2, the ash nutrient may be mixed with a suitable gel 150 or the like so as to facilitate the infusion process, such as by controlling the infusion rate. In a preferred embodiment, the gel 150 is water permeable, so as to slowly dissolve over time.

It should be noted that while in a preferred embodiment, the body 170 is substantially elongate as is shown in the figures so as to assist in the insertion of the apparatus 100 into the ground 110 and to allow the apparatus 110 to protrude from the ground 110, in other embodiments the apparatus 100 need not necessarily be elongate and may, for example, take the form of a substantially round or rectangular body adapted for being buried adjacent the tree 105 or the like.

In a preferred embodiment, the apparatus 100 comprises a taper 180 adapted to facilitate the insertion of the apparatus into the ground 110 in use. Generally, during installation, the body 170 may be forced into the ground including by using a hammer or the like to ensure adequate penetration. In applications having hard ground or tree root impediment, the apparatus 100 may comprise a screw (not shown) to allow the body 170 to be screwed into the ground.

In a yet further embodiment, so as to substantially prevent vandalism, theft and the like, the apparatus 100 comprises a mechanism to substantially prevent the apparatus 100 from being removed from the ground 110 in use. Specifically, as is best shown in FIGS. 3 and 4, in one embodiment the mechanism comprises a flange 175. In a yet further embodiment, the flange 175 is pivotably coupled to the body 170 so as to assume a stowed configuration during the insertion of the apparatus 100 into the ground in use and an extended configuration wherein the flange 175 extends outwardly from the body during the attempted removal of the apparatus 100 from the ground 110 in use.

Now, in one embodiment, and as alluded to above, the apparatus 100 may comprise an infusion determinator adapted to determine the amount or rate of infusion of the ash nutrient in use. In this manner, relatives and the like may determine the amount, or the rate at which, their deceased relative has been infused into the tree 105 or the like.

In one embodiment, the infusion determinator is adapted to determine the amount of ash nutrient remaining within the body 170 in use. As such, but calculated the difference between the amount of ash nutrient over time, the infusion determinator is adapted to determine the amount of nutrients that has been infused.

Referring to FIG. 2, in one embodiment, the infusion determinator comprises a pair of electrical probes 160 adapted for insertion into the ash nutrient in use so as to determine the amount of ash nutrient in accordance with a resistance measurement between the pair of electrical probes 160.

It should be noted that in other embodiments, the infusion determinator may determine the amount or rate of infusion by other means. Specifically, in one other embodiment, as opposed to using the electrical probes 160, the infusion determinator may utilise an ultrasonic sensor adapted to ascertain the location of the top surface of the ash nutrient. In yet further embodiments the infusion determinator may make an estimation in accordance with known infusion rates.

In one embodiment, the apparatus 100 comprises a computing device 120 for performing various computational tasks, including those which are described herein.

Referring to FIG. 2, there is shown the computing device 120 in accordance with two embodiments differentiated primarily on account of the user interface.

As is shown, the computing device 120 may be secured to the body 170 by way of locking pin 165 and locking aperture 130.

In one embodiment, the computing device 120 is adapted to transmit the location of the apparatus 100 such that relatives of the deceased person may ascertain the location of the apparatus 100. As such, in one embodiment, the computing device 120 comprises a location sensor, such as a GPS receiver or the like) and a wireless network interface adapted to send and receive data across a wireless network operably coupled to the location sensor. In this manner, in use, the computing device 120 is adapted to transmit the location of the apparatus 100 via the wireless network.

In embodiments, so as to negate the need for a location sensor, the location of the apparatus 100 may be programmatically input into the computing device 120 during installation.

As such, each apparatus 100 may be programmed with the unique ID or identification details of the deceased person. As such, relatives may search a database or the like available on the Internet to ascertain the location of the apparatus 100.

Specifically, and referring to FIG. 2, in one embodiment, the computing device 120 comprises a microprocessor 150 and a battery supply 140. In embodiments, the battery supply 140 may be complimented or replaced with a photovoltaic cell. Furthermore, the computing device 120 comprises the wireless interface 135. In one embodiment, the wireless interface 135 may be adapted to send and receive data across a cellular network such as by being a GSM wireless interface 135.

In embodiments, as opposed to the wireless interface 135 being a long-range cellular wireless interface, the wireless interface 135 may be a short-range wireless interface, such as by being a Wi-Fi interface so as to communicate with a proximate network access point, or at least one mobile computing device of a relative, such as by using Wi-Fi direct, Bluetooth or the like.

In further embodiments, the wireless interface 135 may be a proximity beacon adapted to transmit proximity beacon broadcasts in accordance with a beacon specification, such as the Apple iBeacon specification.

In yet further embodiment, the wireless interface 135 need not necessarily be an active wireless interface and may take the form of a passive wireless interface, such as a near field communication interface, such as NFC or the like.

As alluded to above, in other embodiments, the computing device 120 may be adapted to perform additional computing tasks.

In one embodiment, and as alluded to above, the computing device 120 may be adapted to display or transmit the amount or rate of infusion as determined by the infusion determinator.

Figure 6:
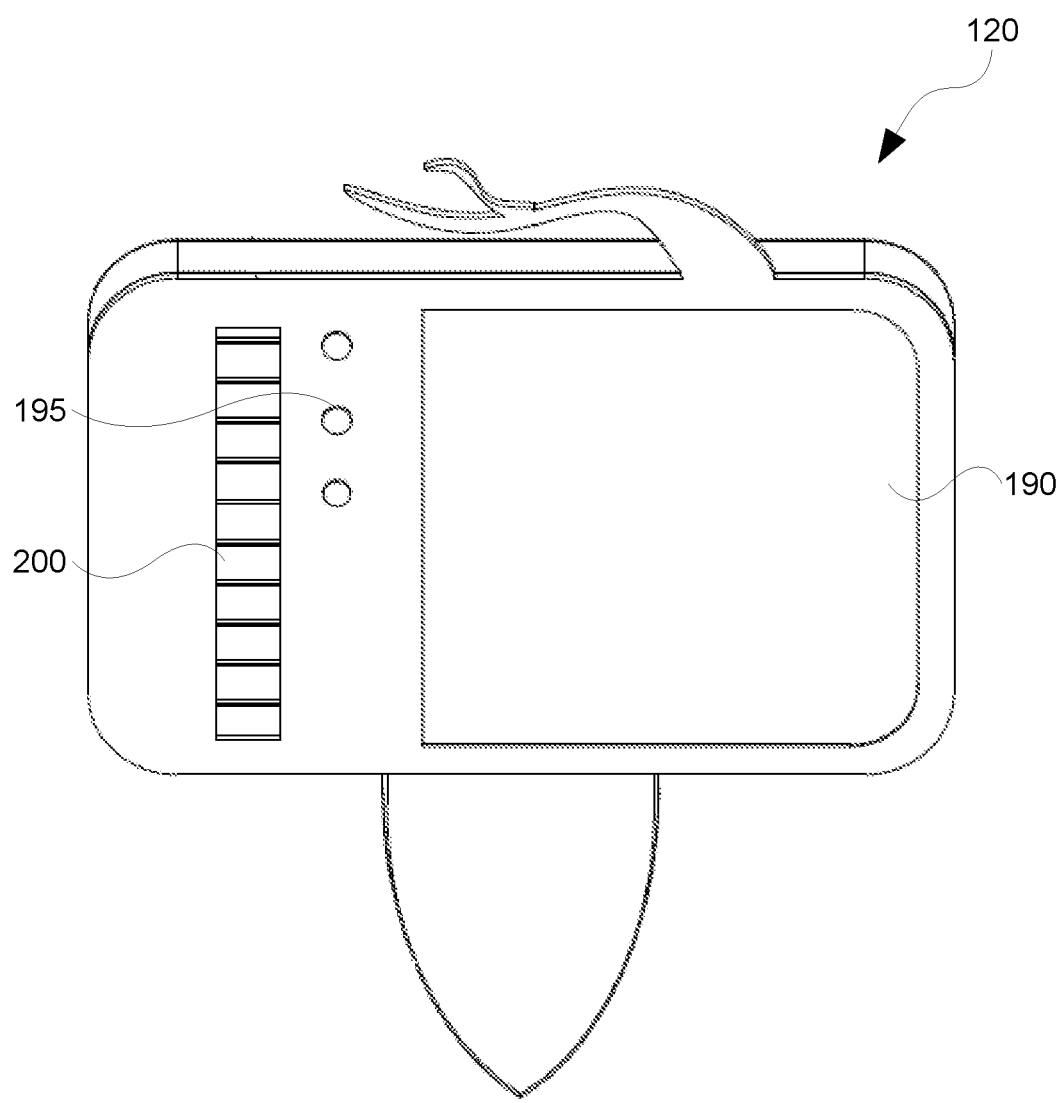
FIG. 6 shows the computing device of the apparatus in further detail in accordance with an embodiment of the present disclosure.

Specifically, referring to FIG. 6, there is shown the computing device 120 in further detail, this being the embodiment wherein the computing device 120 comprises a user interface. As such, in this embodiment, the computing device 120 may comprise a display device 190 such as an LCD digital display device. Furthermore, the computing device 120 may comprise a number of input keys 200 and data display indicators 195.

In other embodiments, the display device 190 may be the above-mentioned photovoltaic cell and the input keys 200 the display indicators 195 and vice versa.

As such, in this embodiment, the computing device 120 may display the rate or amount of infusion using the display device 190 or the data indicators 195. In this manner, at periodic intervals, relatives may visually ascertain the amount of infusion of the deceased relative into the tree 105 or the like. As alluded to above, in other embodiments, as opposed to displaying the rate or amount of infusion, the computing device 120 may transmit the rate or amount of infusion via the wireless network interface 135 such that relatives may view the rate or amount of infusion remotely.

In other embodiments, the computing device 120 may display other information. For example, the computing device 120 may be programmed with anecdotes, information and the like of the deceased person so as to be able to display pictures, videos, audio and the like from the deceased person.

Referring to FIG. 2, in embodiments, the apparatus 100 may comprise a display plaque 115 which may be affixed to the body 170 to display various information, such as information relating to the deceased person.

Interpretation

Embodiments:

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the cremation industry.

The invention claimed is:

1. A process for producing a biocompatible soil mixture from cremated ash remains, the process comprising:
   mixing cremated ash remains with a soil base material and a nutrient composition to produce a pre-conditioned mixture, the nutrient composition comprising at least one of paramagnetic material, soil conditioner and fertilizer; and
   conditioning the pre-conditioned mixture using a microbial conditioner to adjust the adverse chemical properties of the cremated ash remains biologically to produce a conditioned soil mixture being biocompatible for a legacy tree, wherein:
   the pre-conditioned mixture comprises less than 10% of the cremated ash remains by volume; and
   the microbial conditioner comprises a carbon source, water, microbial content and at least one of Humic acid and Fulvic acid.

2. The process as claimed in claim 1, wherein, whereas the cremated ash remains has a pH of between 10 and 12, the conditioner conditions the pre-conditioned mixture such that the conditioned soil mixture has a pH of between 6 and 7 pH.

3. The process as claimed in claim 1, wherein, whereas the cremated ash remains has phosphates of between about 45-52% by volume, the conditioned soil mixture has less than 8% phosphates by volume.

4. The process as claimed in claim 1, wherein the pre-conditioned mixture comprises the cremated ash remains at approximately 5% by volume.

5. The process as claimed in claim 1, wherein the pre-conditioned mixture comprises and the nutrient composition at approximately 7.5% by volume.

6. The process as claimed in claim 1, wherein the pre-conditioned mixture comprises the soil base material at about 90% by volume.

7. The process as claimed in claim 1, wherein the pre-conditioned mixture comprises potting mix at about 45% by volume and compost at about 45% by volume.

8. The process as claimed in claim 1, further comprising populating the conditioner with the bacteria comprising at least one of *Bacillus megaterium; Bacillus thuringiensis; Bacillus mucilaginosus; Bacillus subtilis* and *Bacillus lichemformis*.

9. The process as claimed in claim 1, further comprising pre-processing the conditioner using at least one of a humification and fermentation process.

10. The process as claimed in claim 1, further comprising populating the conditioner with fungus spores.

11. The process as claimed in claim 1, wherein the chemical composition of the nutrient composition comprises approximately 11% organic carbon, 4.9% humate and 6.7% Calcium.

12. The process as claimed in claim 1, wherein at least one of the soil conditioner and the nutrient composition comprises a carbon geosequestration promoter comprising Leonardite at between 5% and 11% by volume.

13. The process as claimed in claim 1, wherein the microbial conditioner further comprises kelp.

14. The process as claimed in claim 13, wherein the microbial conditioner comprises a kelp content of approximately 5% by volume.

15. The process as claimed in claim 1, wherein the microbial conditioner further comprises molasses.

16. The process as claimed in claim 1, wherein the microbial conditioner comprises a Humic acid content of approximately 20% by volume.

17. The process as claimed in claim 1, wherein the microbial conditioner comprises a Fulvic acid content of approximately 5% by volume.

18. The process as claimed in claim 1, wherein the microbial conditioner comprises water and microbial content of approximately 20% by volume.

19. The process as claimed in claim 1, wherein the microbial conditioner comprises a carbon source content of approximately 20% by volume.

20. The process as claimed in claim 1, wherein the microbial conditioner is a liquid microbial conditioner.

21. The process as claimed in claim 20, wherein the step of conditioning the pre-conditioned mixture further comprises saturating the pre-conditioned mixture using the microbial conditioner.

* * * * *